(12) United States Patent
Santos et al.

(10) Patent No.: US 6,307,365 B1
(45) Date of Patent: Oct. 23, 2001

(54) METHOD OF DETERMINING POSITION AND/OR DIRECTION OF A MAGNETIC TARGET

(75) Inventors: A. John Santos, Farmington; Mark E. LaCroix, New Hartford, both of CT (US); Pascal Desbiolles, Biauvy (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/268,450

(22) Filed: Mar. 12, 1999

(51) Int. Cl.[7] ....................................................... G01B 7/00
(52) U.S. Cl. .................. 324/207.12; 324/207.2; 324/165
(58) Field of Search ............................ 324/207.2, 207.12, 324/207.24, 207.25, 207.21, 173, 174, 165; 338/32 R

(56) References Cited

U.S. PATENT DOCUMENTS

| | | | |
|---|---|---|---|
| 4,785,241 | * | 11/1988 | Abiko et al. ..................... 324/207.21 |
| 4,866,382 | * | 9/1989 | Carmen . | |
| 5,430,373 | * | 7/1995 | Ichkawa et al. ................. 324/207.21 |
| 5,589,769 | * | 12/1996 | Krahn . | |
| 5,929,631 | * | 7/1999 | Strker et al. ..................... 324/207.21 |

FOREIGN PATENT DOCUMENTS

| | | | |
|---|---|---|---|
| 0 122 463 A2 | * | 10/1983 | (EP) . |
| 0 590 222 A1 | * | 9/1992 | (EP) . |
| 0 554 518 A1 | * | 10/1992 | (EP) . |

* cited by examiner

*Primary Examiner*—Safet Metjahic
*Assistant Examiner*—Subhash Zaveri
(74) *Attorney, Agent, or Firm*—John C. Bigler

(57) ABSTRACT

A method for determining position and/or direction of a target, where the target has a series of magnetic poles with a magnetic pole spacing d. The method includes the steps of: (A) providing an array of an even number N of magnetic sensors with a sensor spacing x, the sensor array having an initial effective sensor array length (N+1)x, where the initial effective sensor array length is greater than the pole spacing d; (B) deactivating an equal number of magnetic sensors such that the magnetic sensors of the array remaining active are adjacent to each other and provide a new effective sensor array length that is closer to the pole spacing d than the initial effective sensor array length; (C) dividing the magnetic sensors of the array remaining active into two equal groups A and B of at least one adjacent magnetic sensor for signal processing; (D) summing the signals from group A and summing the signals from group B; (E) adding the summation of signals from group B to the summation of signals from group A to obtain a sine wave; and (F) subtracting the summation of signals from group B from the summation of signals from group A to obtain a cosine wave.

17 Claims, 6 Drawing Sheets

METHOD OF DETERMINING POSITION AND/OR DIRECTION OF A MAGNETIC TARGET

BACKGROUND OF THE INVENTION

This invention relates generally to the use of magnetic sensors for determining position and direction of a target having magnetic poles and, more particularly, to the use of an array of a plurality of magnetic sensors to determine position and/or direction.

Multiple magnetic sensors have been placed in proximity to a magnetic field from a multi-pole magnet to determine position and direction of a target. For example, a string of Hall effect devices may be used to provide signals that are summed to produce a sine wave that is representative of the average magnetic field over the multi-pole magnet. Summing the signals from the sensor elements in the first half of the Hall string and subtracting the sum of the signals from sensor elements in the second half of the Hall string produces a cosine wave, that is, a sine wave that is 90 degrees out of phase from the sine wave. The sine and cosine waves can then be used to determine the position and direction of a target equipped with the multi-pole magnet.

Such devices are useful in reducing errors in determining position of the target that are due to variations in the magnetic fields or the spacing of the magnetic poles. However, the known devices and methods require the string of sensor devices to have a length that is matched precisely to the pole spacing of the multi-pole magnet with which the magnetic sensors are to be used. In addition, an external magnetic field will bias the magnetic field, e.g., increasing the magnetic North poles and decreasing the magnetic South poles, causing the sine and cosine curves to shift such that the zero points will not be regularly spaced. In either case, the signal processing of the sine and cosine waves produces errors in the position measurement.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a method for determining position and/or position of a target, the target having a series of magnetic poles with a magnetic pole spacing d. The method comprises providing an array of an even number N of magnetic sensors with a sensor spacing x, the sensor array having an initial effective sensor array length (N+1)x, where the initial effective sensor array length is greater than the pole spacing d (or, alternatively greater than twice the pole spacing d); deactivating an equal number of magnetic sensors such that the magnetic sensors of the array remaining active are adjacent to each other and provide a new effective sensor array length that is closer to the pole spacing d than the initial effective sensor array length; dividing the magnetic sensors of the array remaining active into two equal groups A and B of at least one adjacent magnetic sensor for signal processing; summing the signals from group A and summing the signals from group B; adding the summation of signals from group B to the summation of signals from group A to obtain a sine wave; and subtracting the summation of signals from group B from the summation of signals from group A to obtain a cosine wave.

In a another aspect of the invention, this is accomplished by providing a method including a scaling means to balance the amplitude of a sine wave with respect to a cosine wave.

In a further aspect of the invention, this is accomplished by providing an ASIC chip comprising an array of an even number of magnetic sensors, selection means to selectively deactivate an even number of magnetic sensors such that the remaining magnetic sensors are adjacent to each other and signal processing means to process signals from the remaining magnetic sensors to generate a sine wave and a cosine wave.

The foregoing and other aspects will become apparent from the following detailed description of the invention when considered in conjunction with the accompanying drawing figures.

BRIEF DESCRIPTION OF THE DRAWING FIGS

FIG. 1 a diagram representing a multi-pole magnet and an array of magnetic sensors together with the sine wave and cosine wave produced by processing the signals from the magnetic sensors, with the effective sensor array length matched to the magnetic pole spacing, according to the prior art;

DETAILED DESCRIPTION

Figure 1:
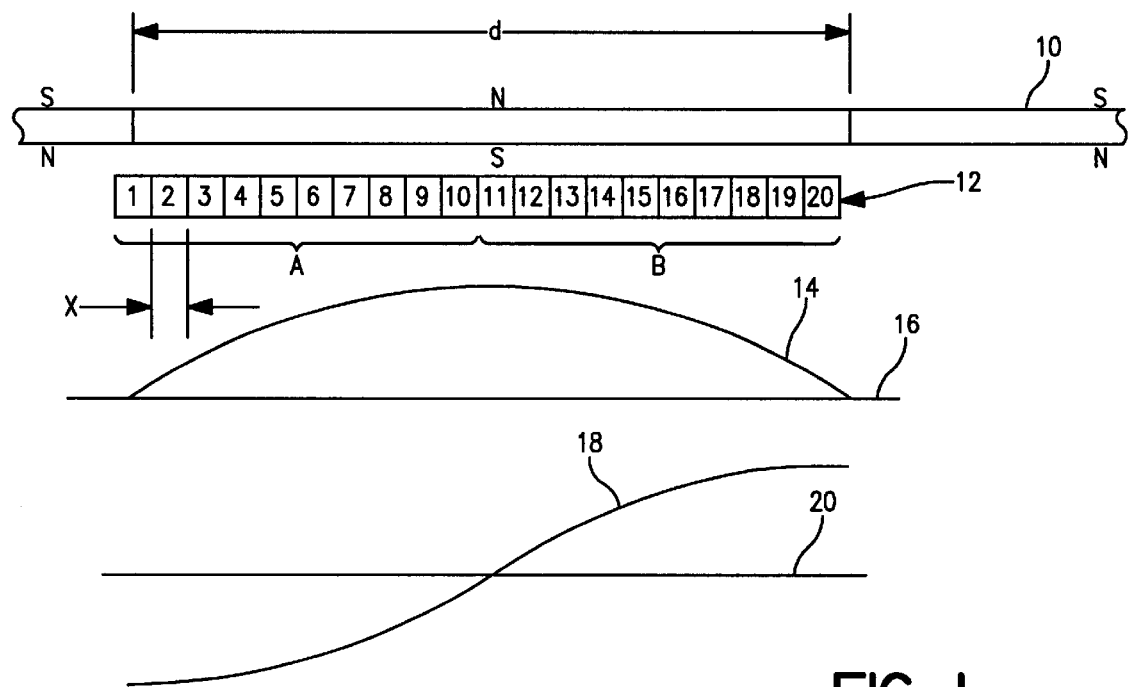

Referring now to the drawing, FIG. 1 illustrates a multi-pole magnet 10 with pole spacing d matched to an array 12 of magnetic sensors according to the prior art described above. Summing the signals from the magnetic sensors A of the first half of the array 12 and subtracting the summation of signals from the magnetic sensors B of the second half of the array 12 produces a sine wave 14 with zero crossings at axis 16. Summing the signals from the magnetic sensors A and subtracting the summation of the signals from the magnetic sensors B produces a cosine wave 18 with zero crossings at axis 20.

In FIG. 1, half the period of the sine (or cosine) wave corresponds to the effective length of the array 12. The effective length of the array 12 is known to be (N+1)x, where N is the number of magnetic sensors and x is the sensor spacing. In the illustration, then number N is 20. The effective length of the array may be shortened from this calculated length if the array is skewed with respect to the orientation of the multi-pole magnet. In FIG. 1, the effective array length is equal to the pole spacing d.

Figure 2:
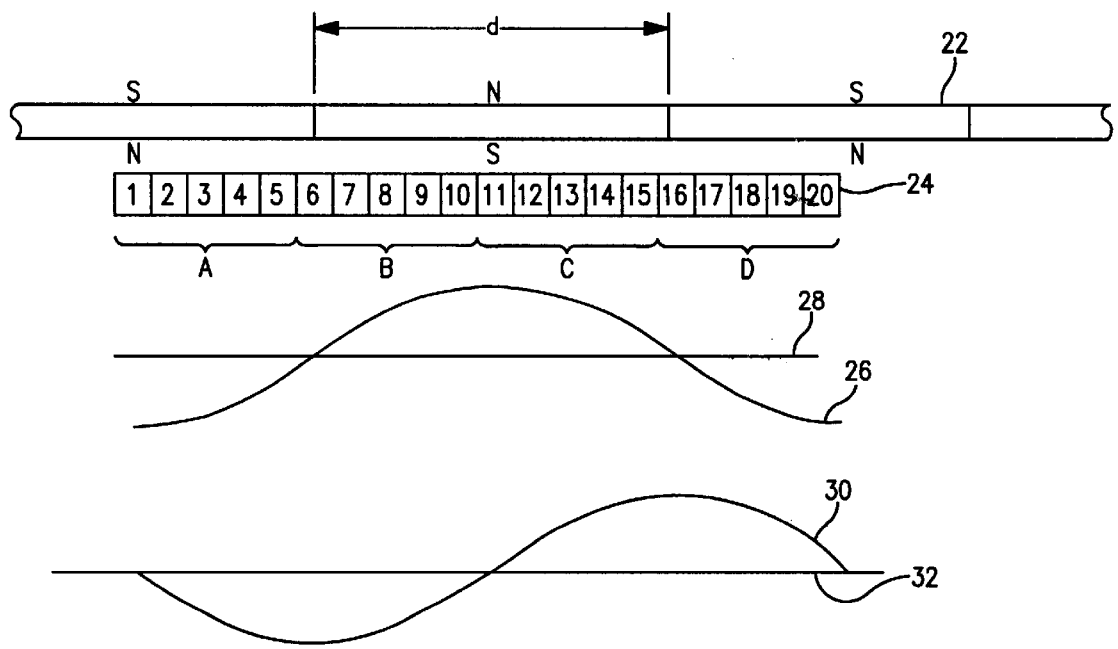
FIG. 2 is a diagram similar to FIG. 1, but with the effective sensor array length matched to twice the magnetic pole spacing.
Figure 3:
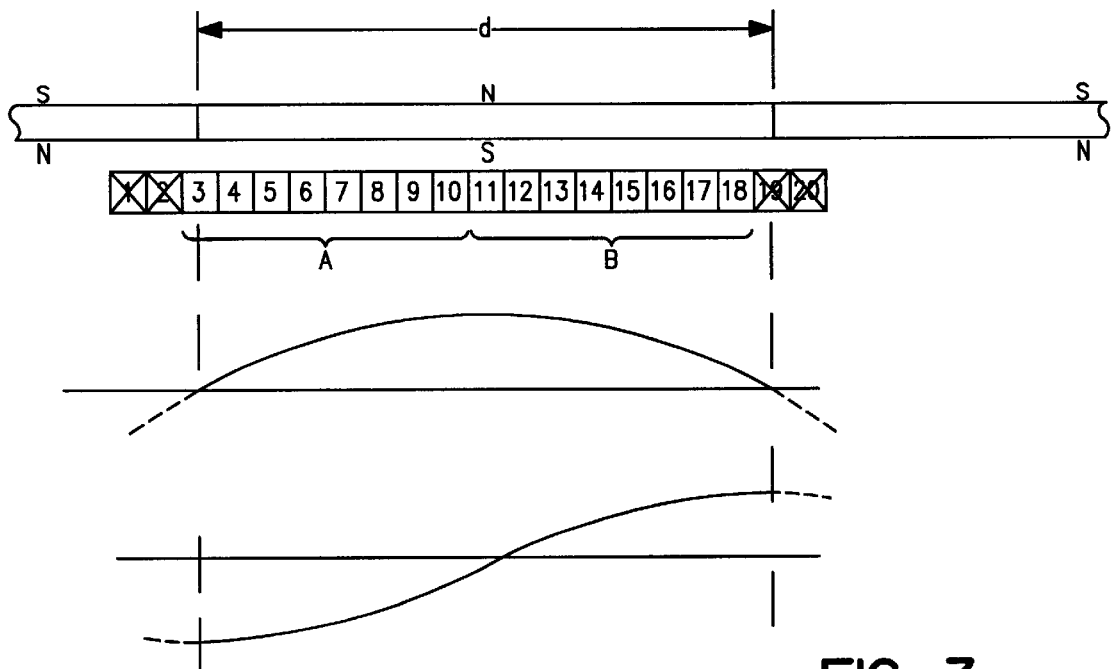
FIGS. 3, 5 and 7 are diagrams similar to FIG. 1, but with the effective sensor array length longer than the magnetic pole spacing, illustrating a method of the present invention.
Figure 4:
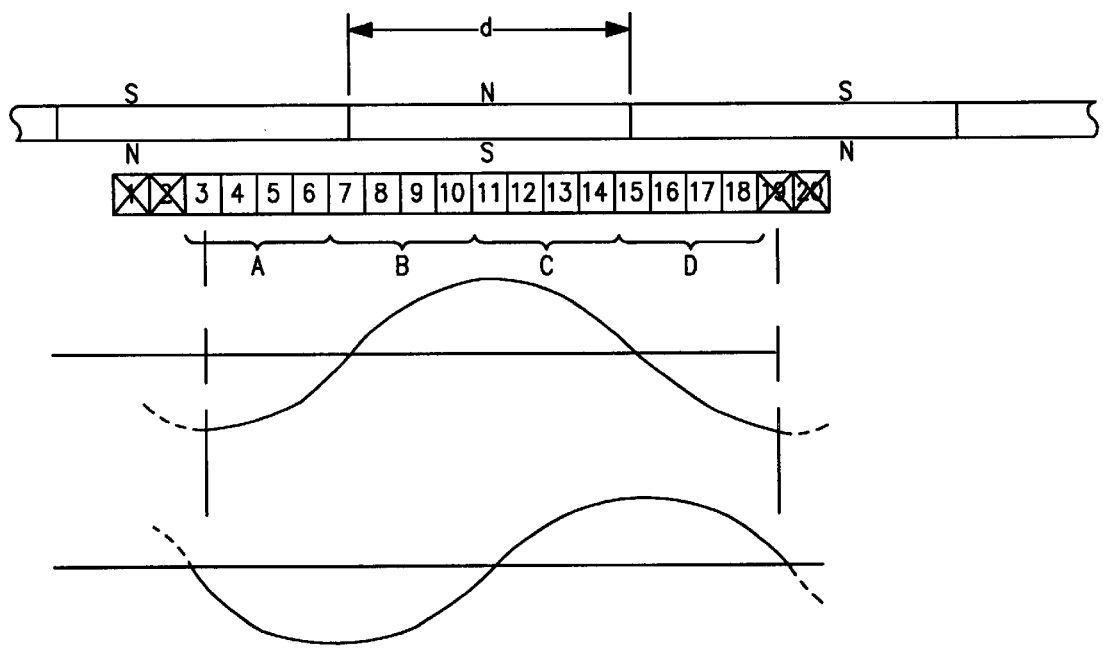
FIGS. 4, 6 and 8 are diagrams similar to FIG. 1, but with the effective sensor array length longer than twice the magnetic pole spacing, illustrating a method of the present invention similar to that of FIGS. 3, 5 and 7.
Figure 5:
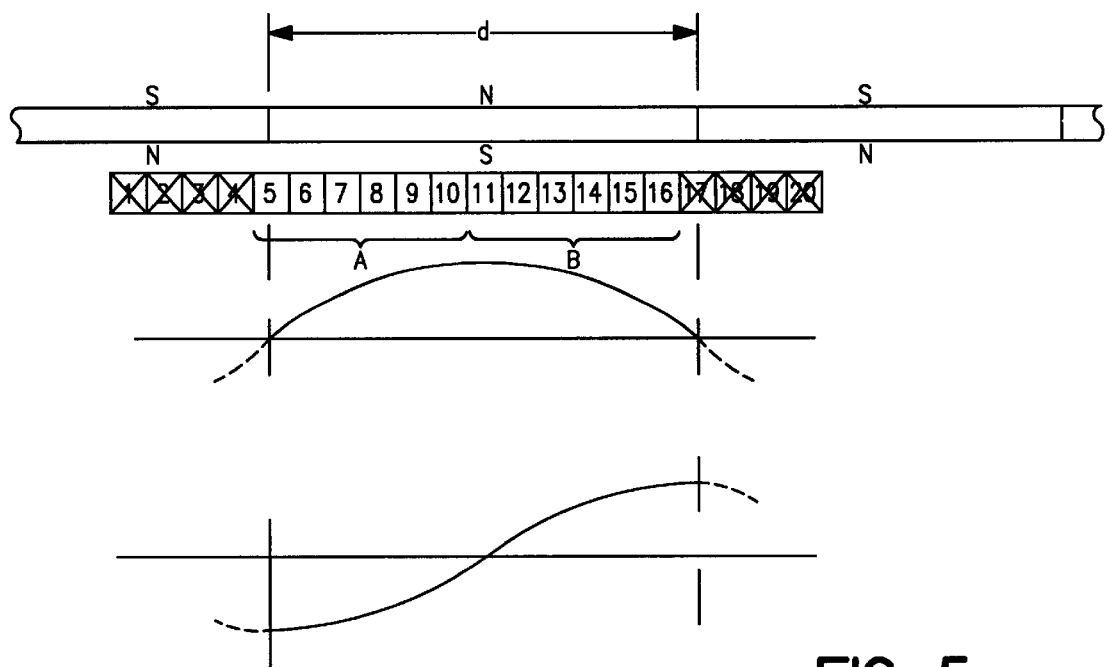
Figure 6:
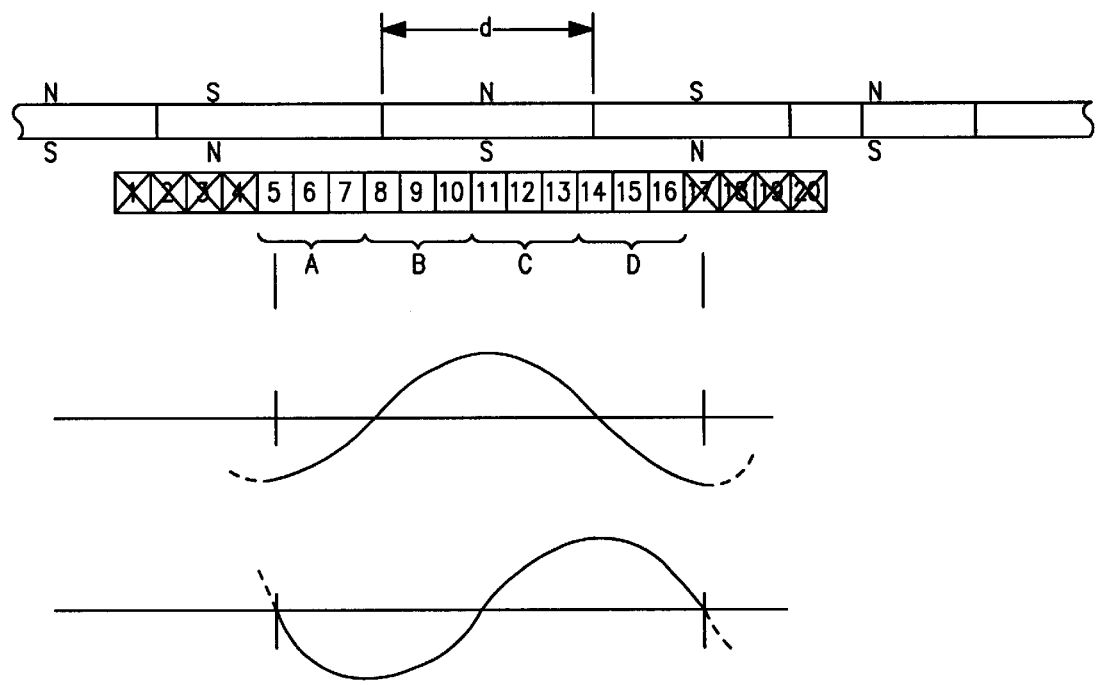
Figure 7:
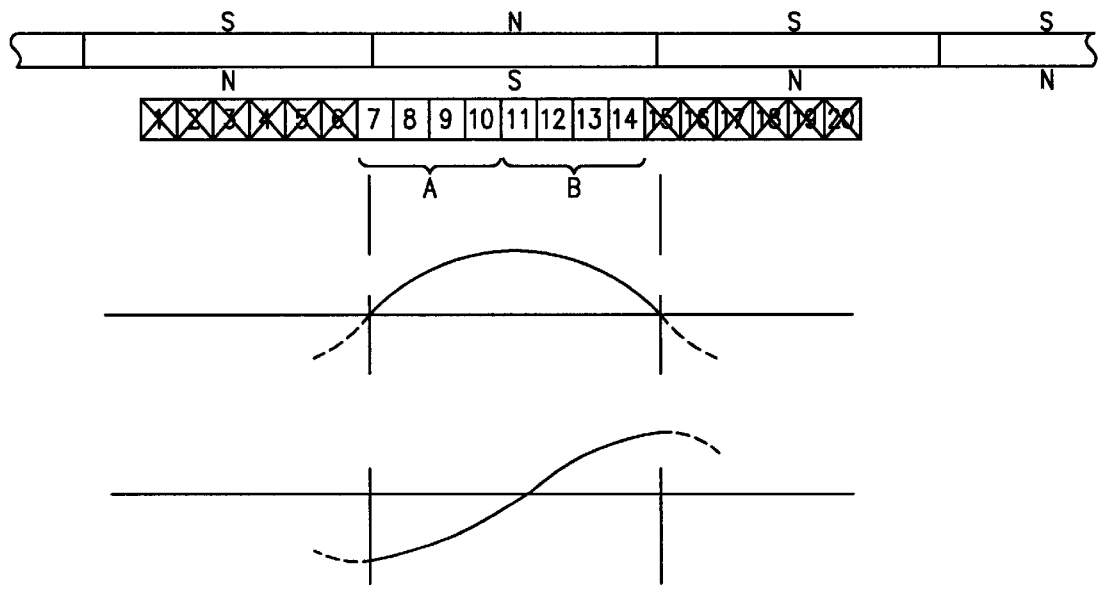
Figure 8:
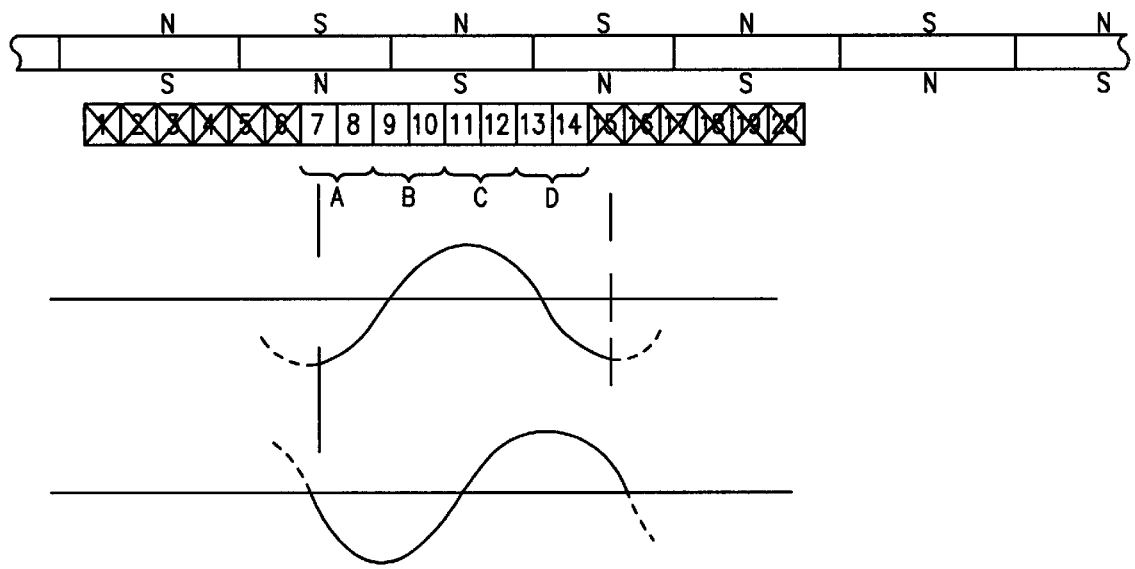

FIG. 2 illustrates a multi-pole magnet 22 with twice the pole spacing d equal to the effective length (N+1)x of an array 24 of magnetic sensors. Summing the signals from the magnetic sensors A and D of the first quarter and fourth quarter of the array 24 and subtracting the summation of signals from the magnetic sensors B and C of the second quarter and third quarter of the array 24 produces a sine wave 28 with zero crossings at axis 28. Summing the signals from the magnetic sensors A and B and subtracting the summation of the signals from the magnetic sensors C and D produces a cosine wave 30 with zero crossings at axis 32. A full period of the sine (or cosine) wave corresponds to the length of the array 24.

In the present invention, an array of magnetic sensors (such as Hall effect devices, for example) can be used to detect either a half period of a multi-pole magnet target or a full period of a multi-pole magnet. The detecting of a full period has the advantage in that it averages out any inconsistencies in the length or strength of the individual magnet poles, allowing the poles to be subdivided with greater accuracy and repeatability. This full period technique has the further advantage of rejecting any biasing magnetic fields seen by the entire array and also rejects common mode electrical noise. This permits use of a magnet that may have a fixed or gradually changing bias field and permits the sensor magnet assembly to be in a magnetic field without adversely affecting the output signal from the sine and cosine circuit.

As illustrated in FIGS. 3 through 10, the present invention can provide an array to detect magnetic poles of different lengths by disabling magnetic sensors from the ends of the array. These are disabled two at a time for the single pole technique and four at a time for the two pole technique. Alternatively, an equal number of magnetic sensors may be disabled at a single end of the array. This disabling of magnetic sensors permits the magnetic sensors remaining active to be grouped to match, approximately, either the pole spacing d or twice the pole spacing d. The processing of the signals is then similar to the processing described with respect to FIGS. 1 and 2.

Figure 9:
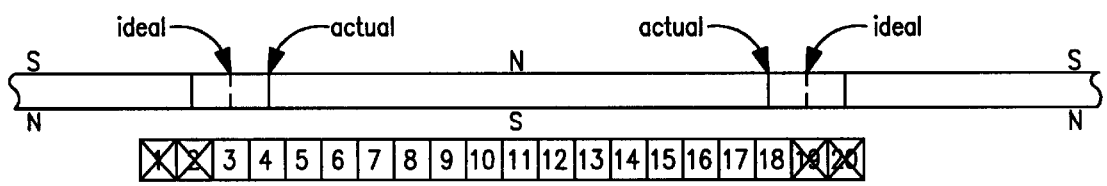
FIG. 9 is a diagram similar to FIG. 3, but with the effective sensor array length longer than the magnetic pole spacing, prior to signal processing according to another method of the present invention.
Figure 9:
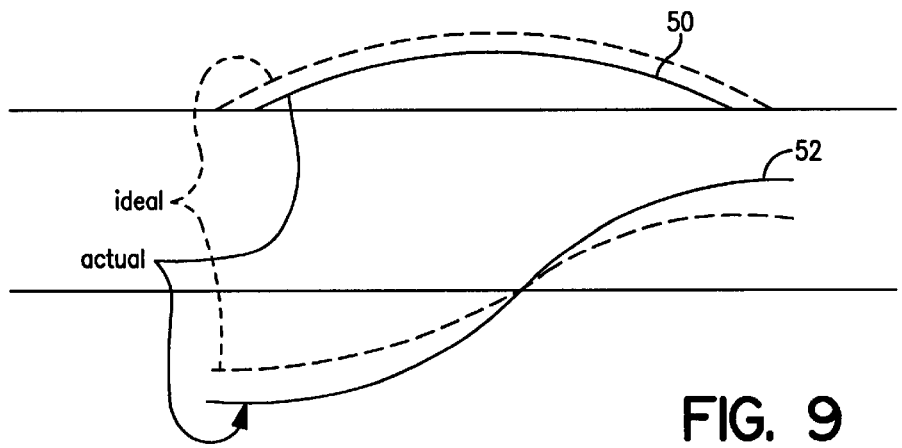
Figure 10:
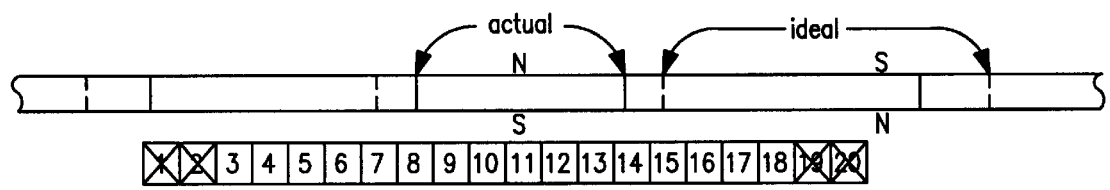
FIG. 10 is a diagram similar to FIG. 4, but with the effective sensor array length longer than the magnetic pole spacing, prior to signal processing according to another method of the present invention.
Figure 10:
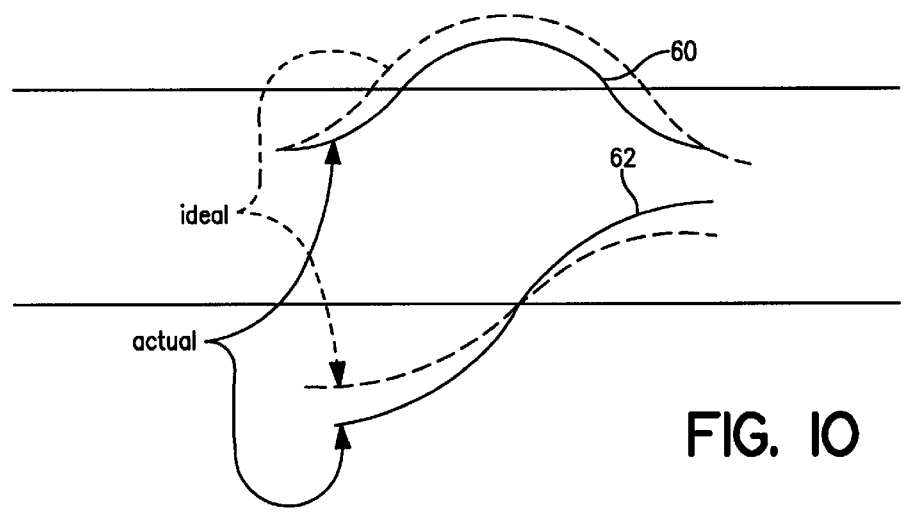
Figure 11:
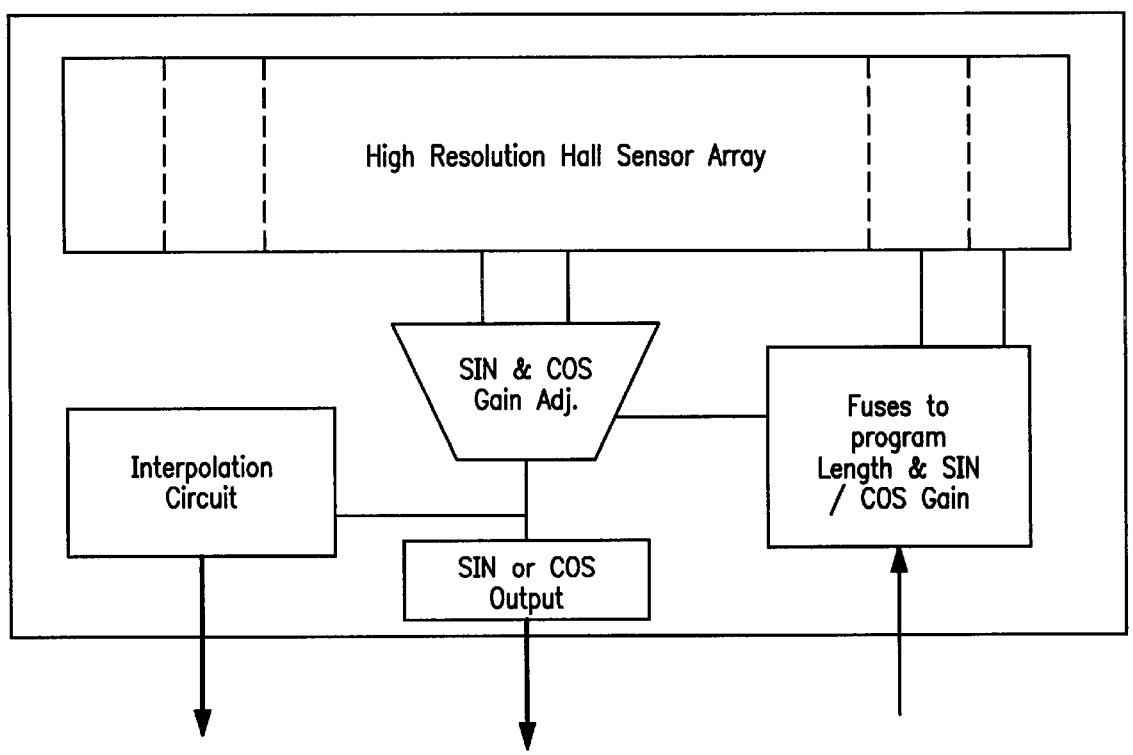
FIG. 11 is a block diagram of an ASIC (application specific integrated circuit) chip illustrating a device according to the present invention for determining the position and/or direction of a target equipped with a multi-pole magnet.

If the effective sensor array length resulting from this truncating of active magnetic sensors is not close enough to either the pole spacing d or twice the pole spacing d, the sine wave and cosine wave that are produced are not balanced, for example, the sine wave 50, or 60, may have an amplitude less than 1 and the cosine wave 52, or 62, may have an amplitude greater than 1, as illustrated in FIGS. 9 and 10. To provide a more accurate adjustment, another aspect of the present invention permits electrical timing of the effective sensor array length to function between the fixed pole lengths dictated by the number of magnetic sensors and their spacing. The summations that produce sine and cosine signals will continue to produce signals that are sine and cosine signals except with either a larger or smaller amplitude when the array length is not matched with the pole length. A scaling means producing a scaling factor or gain is provided between the summation circuits and the circuits that subdivided the sine and cosine signals. This scaling factor sets the amplitudes of the sine and cosine signals equal to each other and allows the use of any width pole.

An additional feature of the present invention makes use of this fine gain adjustment technique more practical. In an application the twist of the array or the radial position of the sensor array over a radial target will effect the effective pole length as seen by the array. A mismatch in the effective array length and the effective pole length will result in a sine and cosine signal of different amplitudes. It is important to match the gain of the sine and cosine signals as best as possible within the chip in order to produce the best quality input signal for the multiplier section of the circuit. In order to make the sensor array chip adjustable in an application it was necessary to gain temporary access to these sine and cosine signals, preferable after the sensor array circuit is in its final operational position.

The present invention provides a method to route the sine and cosine signal out of the chip sharing a signal line of a user required signal. This would allow live fine adjustment of the sine and cosine signals to set the exact pole spacing after assembly. Using an existing signal line saves money and signal lines. Using only one line removes any possible gain mismatch that may be associated with using two separate lines for the sine and cosine signals. The sensor assembly can be programmed in an application after assembly for maximum performance. After programming the line used to verify the signal levels can be reprogrammed to serve a different function for the customer.

Having described the invention, what is claimed is:

1. A method for determining position and/or direction of a target, the target having a series of magnetic poles with a magnetic pole spacing d, the method comprising:

providing an array of an even number N of magnetic sensors with a sensor spacing x, the sensor array having an initial effective sensor array length (N+1)x, where the initial effective sensor array length is greater than the pole spacing d;

deactivating an equal number of magnetic sensors such that the magnetic sensors of the array remaining active are adjacent to each other and provide a new effective sensor array length that is closer to the pole spacing d than the initial effective sensor array length;

dividing the magnetic sensors of the array remaining active into two equal groups A and B of at least one adjacent magnetic sensor for signal processing;

summing the signals from group A and summing the signals from group B;

adding the summation of signals from group B to the summation of signals from group A to obtain a sine wave; and subtracting the summation of signals from group B from the summation of signals from group A to obtain a cosine wave.

2. A method according to claim 1, further comprising a scaling means to balance the amplitude of the sine wave with respect to the amplitude of the cosine wave.

3. A method according to claim 1, wherein the array of magnetic sensors is located on an ASIC (application specific integrated circuit) chip, and wherein the deactivating of an even number of magnetic sensors is provided by a plurality of fuses on the ASIC chip that are activated.

4. A method according to claim 1, wherein the deactivation of magnetic sensors is such that an equal number of magnetic sensors is deactivated on each end of the array of magnetic sensors.

5. A method for determining position and/or direction of a target, the target having a series of magnetic poles with a magnetic pole spacing d, the method comprising:

providing an array of an even number N of magnetic sensors with a sensor spacing x, the sensor array having an initial effective sensor array length (N+1)x, where the initial effective sensor array length is greater than twice the pole spacing d;

deactivating an equal number of magnetic sensors such that the magnetic sensors of the array remaining active are adjacent to each other and provide a new effective sensor array length that is closer to the pole spacing d than the initial effective sensor array length;

dividing the magnetic sensors of the array remaining active into four equal groups A, B, C and D of at least one adjacent magnetic sensor for signal processing;

summing the signals from each of the four groups of magnetic sensors;

subtracting the summation of signals from groups A and D from the summation of signals from groups B and C to obtain a sine wave; and subtracting the summation of signals from groups C and D from the summation of signals from groups A and B to obtain a cosine wave.

6. A method according to claim 5, further comprising a scaling means to balance the amplitude of the sine wave with respect to the amplitude of the cosine wave.

7. A method according to claim 5, wherein the array of magnetic sensors is located on an ASIC (application specific integrated circuit) chip, and wherein the deactivating of an even number of magnetic sensors is provided by a plurality of fuses on the ASIC chip that are activated.

8. A method according to claim 5, wherein the deactivation of magnetic sensors is such that an equal number of magnetic sensors is deactivated on each end of the array of magnetic sensors.

9. A method for determining position and/or direction of a target, the target having a series of magnetic poles with a magnetic pole spacing d, the method comprising:

providing an array of an even number N of magnetic sensors with a sensor spacing x, the sensor array having an initial effective sensor array length (N+1)x, where the initial effective sensor array length is greater than twice the pole spacing d;

deactivating an equal number of magnetic sensors such that the remaining magnetic sensors are adjacent to each other and provide a new effective sensor array length that is closer to the pole spacing d than the initial effective sensor array length;

dividing the remaining magnetic sensors of the array into two equal groups A and B of adjacent magnetic sensors for signal processing;

summing the signals from group A and summing the signals from group B;

adding the summation of signals from group B to the summation of signals from group A to obtain a sine wave;

subtracting the summation of signals from group B from the summation of signals from group A to obtain a cosine wave; and using a scaling means to balance the amplitude of the sine wave with respect to the amplitude of the cosine wave.

10. A method for determining position and/or direction of a target, the target having a series of magnetic poles with a magnetic pole spacing d, the method comprising:

providing an array of an even number N of magnetic sensors with a sensor spacing x, the sensor array having an initial effective sensor array length (N+1)x, where the initial effective sensor array length is greater than twice the pole spacing d;

deactivating an equal number of magnetic sensors such that the remaining active magnetic sensors are adjacent to each other and provide a new effective sensor array length that is closer to the pole spacing d than the initial effective sensor array length;

dividing the remaining magnetic sensors of the array into four equal groups A, B, C and D of adjacent magnetic sensors for signal processing;

summing the signals from each of the four groups of magnetic sensors;

subtracting the summation of signals from groups A and D from the summation of signals from groups B and C to obtain a sine wave; and subtracting the summation of signals from groups C and D from the summation of signals from groups A and B to obtain a cosine wave; and using a scaling means to balance the amplitude of the sine wave with respect to the amplitude of the cosine wave.

11. An ASIC (application specific integrated circuit) chip for determining position and/or direction of a target having magnetic poles, the ASIC chip comprising:

an array comprising an even number of magnetic sensors providing an effective array length;

selection means to selectively deactivate at least one even number of magnetic sensors such that the magnetic sensors of the array remaining active are adjacent to each other; and signal processing means to process signals from the remaining magnetic sensors to generate a sine wave and a cosine wave.

12. An ASIC chip according to claim 11, further comprising:

scaling means to balance the amplitude of the sine wave with respect to the cosine wave.

13. An ASIC chip according to claim 12, wherein the scaling means comprises a plurality of fuses that are activated to provide a plurality of gain settings.

14. An ASIC chip according to claim 11, wherein the selection means comprises a plurality of fuses that may be activated to reduce the effective array length.

15. An ASIC chip according to claim 11, wherein the magnetic sensors remaining active may be applied to a multi-pole magnet with a pole spacing approximating the effective array length of said active magnetic sensors.

16. An ASIC chip according to claim 11, wherein the magnetic sensors of the array remaining active are applied to a multi-pole magnet with a pole spacing approximating half the effective array length of said active magnetic sensors.

17. An ASIC chip according to claim 11, wherein the selection means can selectively deactivate more than one even number of magnetic sensors to provide more than one shortened effective array length.

* * * * *